(12) United States Patent
Sumita et al.

(10) Patent No.: US 8,531,148 B2
(45) Date of Patent: Sep. 10, 2013

(54) CONTROL APPARATUS AND CONTROL METHOD FOR AC ELECTRIC MOTOR

(75) Inventors: Satoshi Sumita, Hitachi (JP); Kazuaki Tobari, Hitachiota (JP); Daisuke Maeda, Hitachinaka (JP); Yasuo Notohara, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 135 days.

(21) Appl. No.: 13/171,626

(22) Filed: Jun. 29, 2011

(65) Prior Publication Data

US 2012/0001581 A1 Jan. 5, 2012

(30) Foreign Application Priority Data

Jun. 30, 2010 (JP) ................................. 2010-148802

(51) Int. Cl.
*H02P 7/00* (2006.01)
(52) U.S. Cl.
USPC ................ 318/490; 363/98; 363/3; 363/21.1; 363/41; 324/76.11
(58) Field of Classification Search
USPC ............... 318/636, 638, 400.15, 400.35, 650, 318/71, 787, 811, 566, 400.17, 490; 324/76.11; 363/98, 3, 21.1, 41
See application file for complete search history.

(56) References Cited

U.S. PATENT DOCUMENTS

| 4,808,903 | A  | * | 2/1989 | Matsui et al. ................. 318/800 |
| 6,583,593 | B2 | * | 6/2003 | Iijima et al. ............... 318/400.32 |
| 2004/0183498 | A1 | * | 9/2004 | Iwaji et al. .................... 318/801 |
| 2008/0079385 | A1 | * | 4/2008 | Hashimoto et al. ........... 318/801 |
| 2012/0181960 | A1 | * | 7/2012 | Kameyama ............. 318/400.13 |

FOREIGN PATENT DOCUMENTS

| JP | 3610897 | 10/2004 |
| JP | 2007-116817 | 5/2007 |
| JP | 2007-221999 | 8/2007 |

* cited by examiner

*Primary Examiner* — Eduardo Colon Santana
*Assistant Examiner* — Said Bouziane
(74) *Attorney, Agent, or Firm* — Antonelli, Terry, Stout & Kraus, LLP.

(57) ABSTRACT

A control apparatus and a control method for an AC electric motor detect DC bus current plural times at predetermined intervals during first and second predetermined periods and multiply vectors having integrated values of detected values during respective periods as elements by an inverse matrix of a matrix having integrated values during respective periods of sine and cosine functions of output voltage phase of an inverter at the moment that detection is made as elements to thereby estimate reactive and active currents.

11 Claims, 10 Drawing Sheets

CONTROL APPARATUS AND CONTROL METHOD FOR AC ELECTRIC MOTOR

BACKGROUND OF THE INVENTION

The present invention relates to a control apparatus and a control method for an AC electric motor.

In order to drive an electric motor highly efficiently, it is necessary to estimate a motor current flowing through the electric motor accurately.

In a technique described in Japanese Patent No. 3610897, current information for 2 phases is detected from DC bus current and a motor current is estimated on the basis of the detected value. However, the current information for 2 phases is obtained within a period of carrier and accordingly it is necessary to adjust switching timing of inverter. This adjustment increases an operation load of a microcomputer and noise.

In a technique described in JP-A-2007-221999, in order to solve the above problem, the motor current can be estimated on the basis of only current information for one phase. Instead, it is necessary to calculate an integrated value of the product of a detected value of DC bus current and a periodic function within a predetermined period in order to estimate the current once. At high-speed driving, since the number of times of detection within the period is reduced and the integrated value is not obtained exactly, the estimation accuracy of current is lowered. Furthermore, the current estimation algorithm contains the periodic function and accordingly operation load and calculation error are produced.

In a technique described in JP-A-2007-116817, the current is estimated on the basis of an integrated value of U-phase current (or V-phase or W-phase current) instead of DC bus current. The current estimation algorithm does not contain the periodic function and is simple. However, similarly to the technique described in JP-A-2007-221999, the number of times of detection within the period is reduced at high-speed driving, so that the estimation accuracy is lowered.

SUMMARY OF THE INVENTION

According to the present invention, there can be provided a control apparatus and a control method for an AC electric motor which can estimate a motor current with reduced operation load and high estimation accuracy.

According to an aspect of the present invention, DC bus current is detected plural times at predetermined intervals during first and second predetermined periods and vectors having integrated values of detected values during respective periods as elements are multiplied by an inverse matrix of a matrix having integrated values during respective periods of sine and cosine functions of output voltage phase of an inverter at the moment that detection is made as elements to thereby estimate reactive and active currents.

At this time, elements of the inverse matrix are corrected in accordance with the timing that detection is made and accordingly estimation accuracy of current is not reduced even if detection intervals are coarse.

According to a desirable embodiment of the present invention, current detector can use a low-pass filter to thereby suppress detection error due to ringing.

Further, according to another desirable embodiment of the present invention, the length of detection period can be adjusted to thereby improve estimation accuracy of current or shorten update period of current estimation.

Moreover, according to a further desirable embodiment of the present invention, elements of the matrix can be corrected in consideration of harmonics to thereby estimate current correctly even if harmonic component is contained in current.

According to a desirable embodiment of the present invention, reactive and active currents flowing through AC electric motor can be estimated with reduced operation load and high accuracy.

Other objects, features and advantages of the invention will become apparent from the following description of the embodiments of the invention taken in conjunction with the accompanying drawings.

DESCRIPTION OF THE EMBODIMENTS

Embodiments of the present invention are now described with reference to the accompanying drawings.

Embodiment 1

Figure 1:
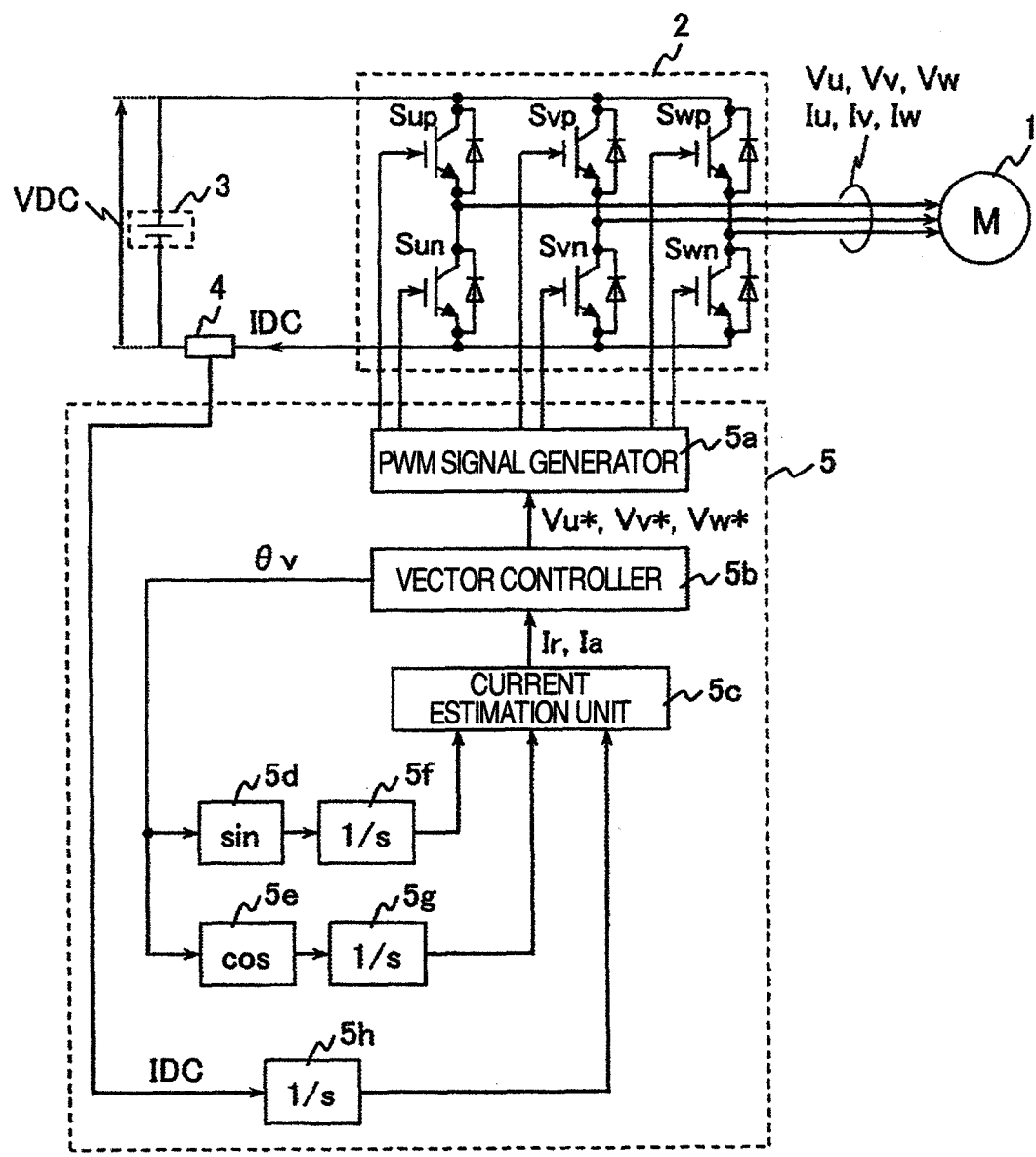
FIG. 1 is a schematic diagram illustrating the whole control apparatus for an AC electric motor according to a first embodiment of the present invention.

FIG. 1 is a schematic diagram illustrating the whole control apparatus for an AC electric motor 1 according to a first embodiment of the present invention.

The AC electric motor 1 produces motor torque according to three-phase currents Iu, Iv and Iw. An inverter 2 includes switching devices Sup, Sun, Svp, Svn, Swp and Swn and applies three-phase voltages Vu, Vv and Vw to the AC electric motor 1. A DC power supply 3 generates a DC voltage VDC to be supplied to the inverter 2. A DC bus current detector 4 detects a DC bus current IDC of the inverter 2. An inverter control circuit 5 includes a PWM (Pulse Width Modulation) signal generator 5a, a vector controller 5b, a current estimation unit 5c, a sine function operation unit 5d, a cosine function operation unit 5e and integrators 5f to 5h and controls to turn on and off the switching devices Sup, Sun, Svp, Svn, Swp and Swn.

Each unit is now described in detail.

Figure 2:
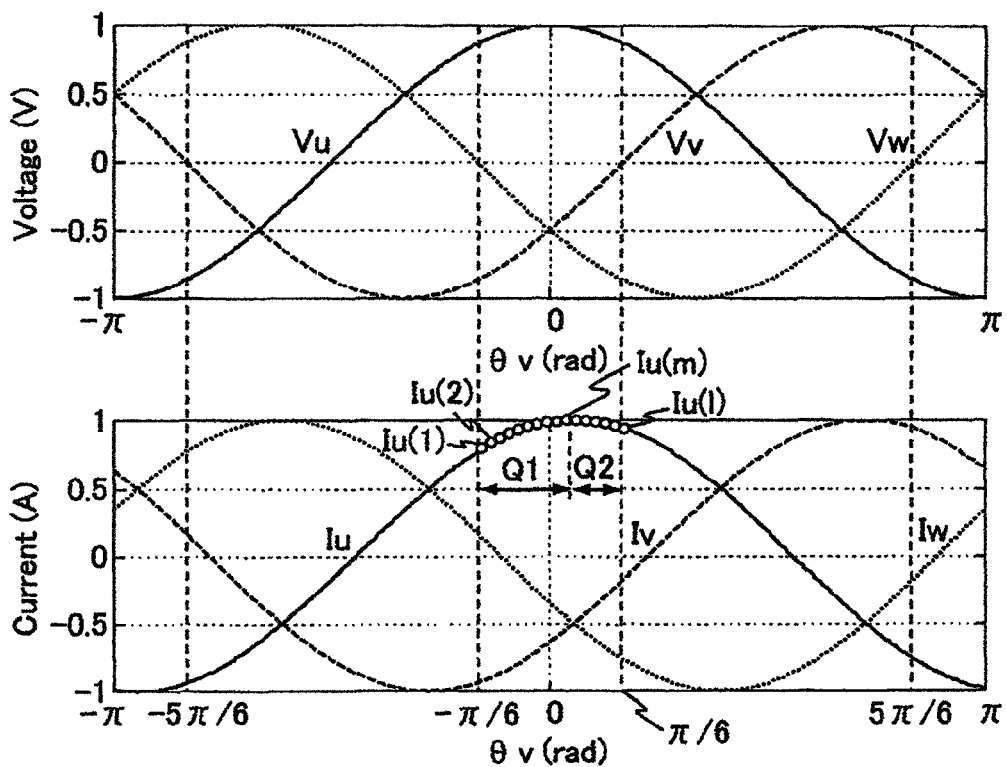
FIG. 2 shows voltage and current waveforms in three-phase modulation system.

As shown in FIG. 2, the inverter 2 produces three-phase AC voltages Vu, Vv and Vw defined by expression (1), so that three-phase AC currents Iu, Iv and Iw defined by expression (2) flow through the AC electric motor 1.

$$\begin{bmatrix} V_u \\ V_v \\ V_w \end{bmatrix} = V_1 \begin{bmatrix} \cos\theta_v \\ \cos\left(\theta_v - \frac{2\pi}{3}\right) \\ \cos\left(\theta_v + \frac{2\pi}{3}\right) \end{bmatrix} \quad (1)$$

$$\begin{bmatrix} I_u \\ I_v \\ I_w \end{bmatrix} = I_1 \begin{bmatrix} \cos(\theta_v - \varphi) \\ \cos\left(\theta_v - \varphi - \frac{2\pi}{3}\right) \\ \cos\left(\theta_v - \varphi + \frac{2\pi}{3}\right) \end{bmatrix} \quad (2)$$

where V1 represents motor voltage, I1 motor current, θv voltage phase in regard to U axis and ψ voltage/current phase.

Figure 3:
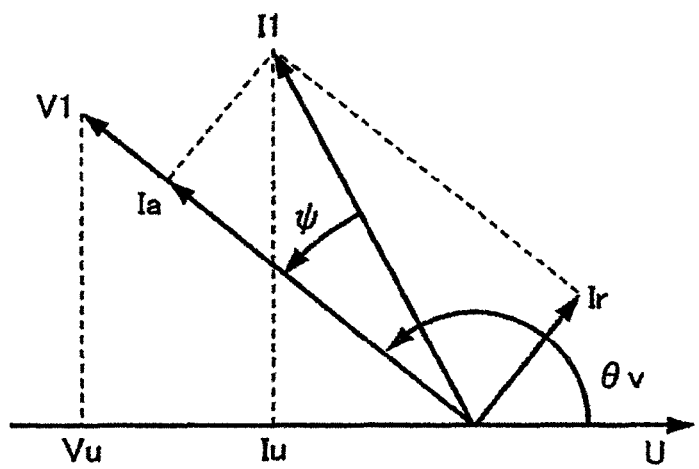
FIG. 3 is a vector diagram showing voltage and current components.

FIG. 3 shows the relation of voltage, current and phase. U axis of FIG. 3 represents U-phase coil direction of stator of the AC electric motor 1. U-phase voltage Vu and U-phase current Iu are components in U-axis direction of motor voltage V1 and motor current I1. Although not shown in FIG. 3, Vv, Iv, Vw and Iw are also the same.

The DC bus current detector 4 detects any of Iu, Iv and Iw as DC bus current IDC. The kind of detectable current is decided depending on turning on and off of switching devices Sup, Sun, Svp, Svn, Swp and Swn. It is hereinafter supposed that voltage phase θv is −π/6<θv<π/6 and at this time only U-phase voltage is positive (or negative) and U-phase current Iu can be detected.

When the AC electric motor 1 is rotated, voltage phase θv also advances. At this time, as shown in FIG. 2, U-phase current Iu is detected once in total and detected values thereof are supposed to be Iu(1), Iu(2), ..., Iu(m), ..., Iu(l). Voltage phase θv at this detection time of Iu(n) is represented by θv(n). Furthermore, period Q1 that Iu(1), ..., Iu(m) are detected is defined as a first period and period Q2 that Iu(m+1), ..., Iu(l) are detected is defined as a second period.

The sine function operation unit 5d and the cosine function operation unit 5e produce values of sine function sin(θv(n)) and cosine function cos(θv(n)) having θv(n) as an argument, respectively.

The integrators 5f to 5h integrate Iu(n), sin(θv(n)) and cos(θv(n)) in two periods of first and second periods. That is, Iu(1), ..., Iu(m) and θv(1), ..., θv(m) are integrated in first period and Iu(m+1), ..., Iu(l) and θv(m+1), ..., θv(l) are integrated in second period. The calculation is integration theoretically but it is to calculate the sum total of detected values in embodiment.

The current estimation unit 5c which is a feature of the present invention estimates reactive current Ir of expression (3) and active current Ia of expression (4) on the basis of integrated values of Iu(n) and θv(n) in first and second periods.

$$I_r = I_1 \sin\phi \quad (3)$$

$$I_a = I_1 \cos\phi \quad (4)$$

The fundamental principle of current estimation to be proposed is now described.

When expressions (3) and (4) are used, U-phase current Iu of expression (2) is expressed by expression (5).

$$I_u = I_r \sin\theta_v + I_a \cos\theta_v \quad (5)$$

In both sides of expression (5), integration in first and second periods is expressed by expressions (6) and (7), respectively.

$$\sum_{n=1}^{m} I_u(n) = I_r \sum_{n=1}^{m} \sin\theta_v(n) + I_a \sum_{n=1}^{m} \cos\theta_v(n) \quad (6)$$

$$\sum_{n=m+1}^{l} I_u(n) = I_r \sum_{n=m+1}^{l} \sin\theta_v(n) + I_a \sum_{n=m+1}^{l} \cos\theta_v(n) \quad (7)$$

When expressions (6) and (7) are arranged, the following expression (8) is derived.

$$\begin{bmatrix} I_r \\ I_a \end{bmatrix} = \begin{bmatrix} \sum_{n=1}^{m} \sin\theta_v(n) & \sum_{n=1}^{m} \cos\theta_v(n) \\ \sum_{n=m+1}^{l} \sin\theta_v(n) & \sum_{n=m+1}^{l} \cos\theta_v(n) \end{bmatrix}^{-1} \begin{bmatrix} \sum_{n=1}^{m} I_u(n) \\ \sum_{n=m+1}^{l} I_u(n) \end{bmatrix} \quad (8)$$

Component of inverse matrix on right side of expression (8) is obtained by integrators 5f and 5g and similarly component of vector on right side is obtained by integrator 5h, so that reactive current Ir and active current Ia can be estimated.

The estimation method is characterized in that even when the number of times l of detection is reduced, the estimation accuracy of current can be maintained.

Figure 4A:
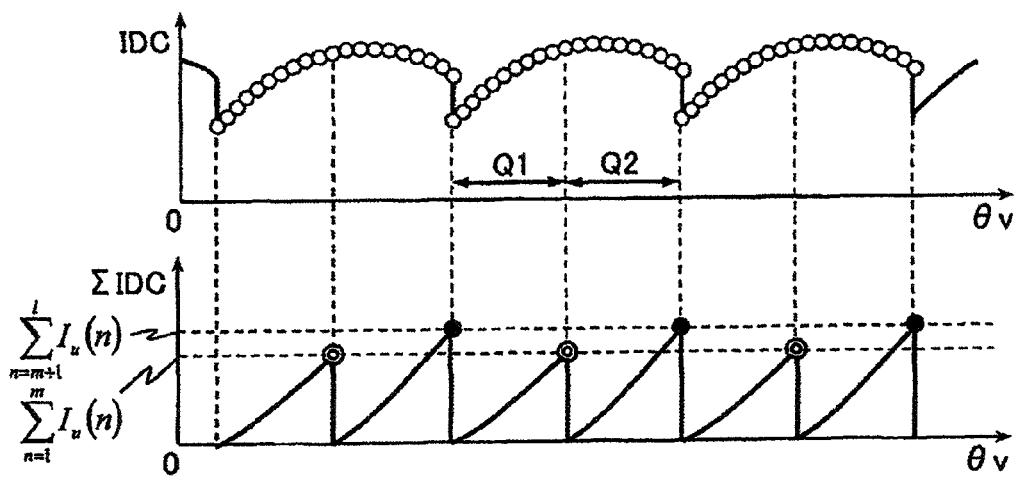
FIGS. 4A and 4B show waveforms indicating detection timing of U-phase current.
Figure 4B:
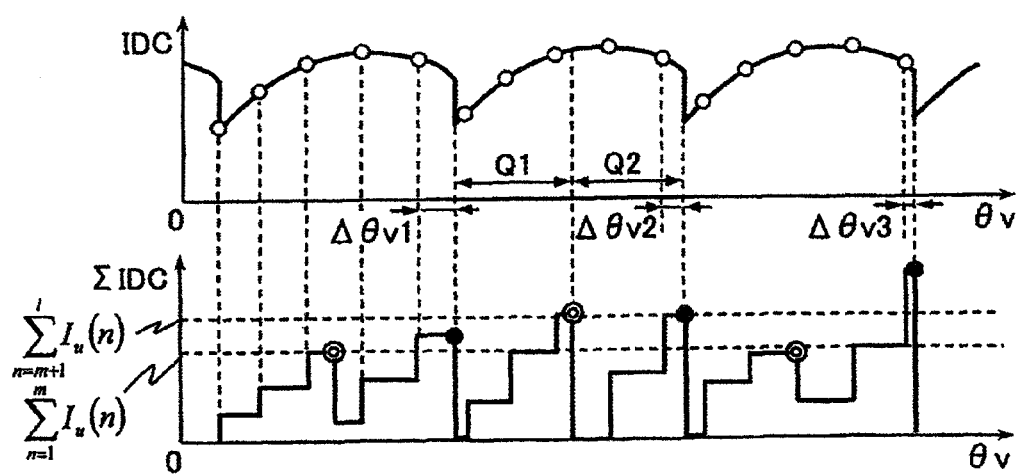

FIG. 4 shows detection timing of current Iu(n). FIG. 4A shows the case where the number of times of detection is sufficiently increased and integrated values of Iu(n) are substantially fixed at adjacent periods in the steady state in each of first and second periods. However, when operation load is limited or when high-speed driving is performed, sampling or the number of times of detection of current is reduced during first or second period. In this case, as shown in FIG. 4B, deviations Δθv1, Δθv2 and Δθv3 are produced during detection period. Consequently, even when the AC electric motor 1 is in steady state, integrated value of Iu(n) of expression (8) is changed during each of first and second periods. In the conventional method, there is a problem that current estimation value is also changed and control performance is deteriorated.

In the present estimation method, the changed component is absorbed and accordingly the inverse matrix of expression (8) is corrected according to detection (sampling) timing. Therefore, estimation values of reactive current Ir and active current Ia are not changed.

The vector controller 5b performs vector control operation using reactive current Ir and active current Ia and decides three-phase AC voltage commands Vu*, Vv* and Vw*. Even when another control operation is used instead of vector control, the present invention is applicable.

The PWM signal generator 5a controls to turn on and off the switching devices Sup, Sun, Svp, Svn, Swp and Swn by PWM control. The switching devices Sup and Sun, Svp and Svn, and Swp and Swn are operated complementarily so that one is on when the other is off. Furthermore, even if there is provided dead time that both of them are off, the present invention is not essentially influenced by the dead time and the present invention is applicable.

Figure 5:
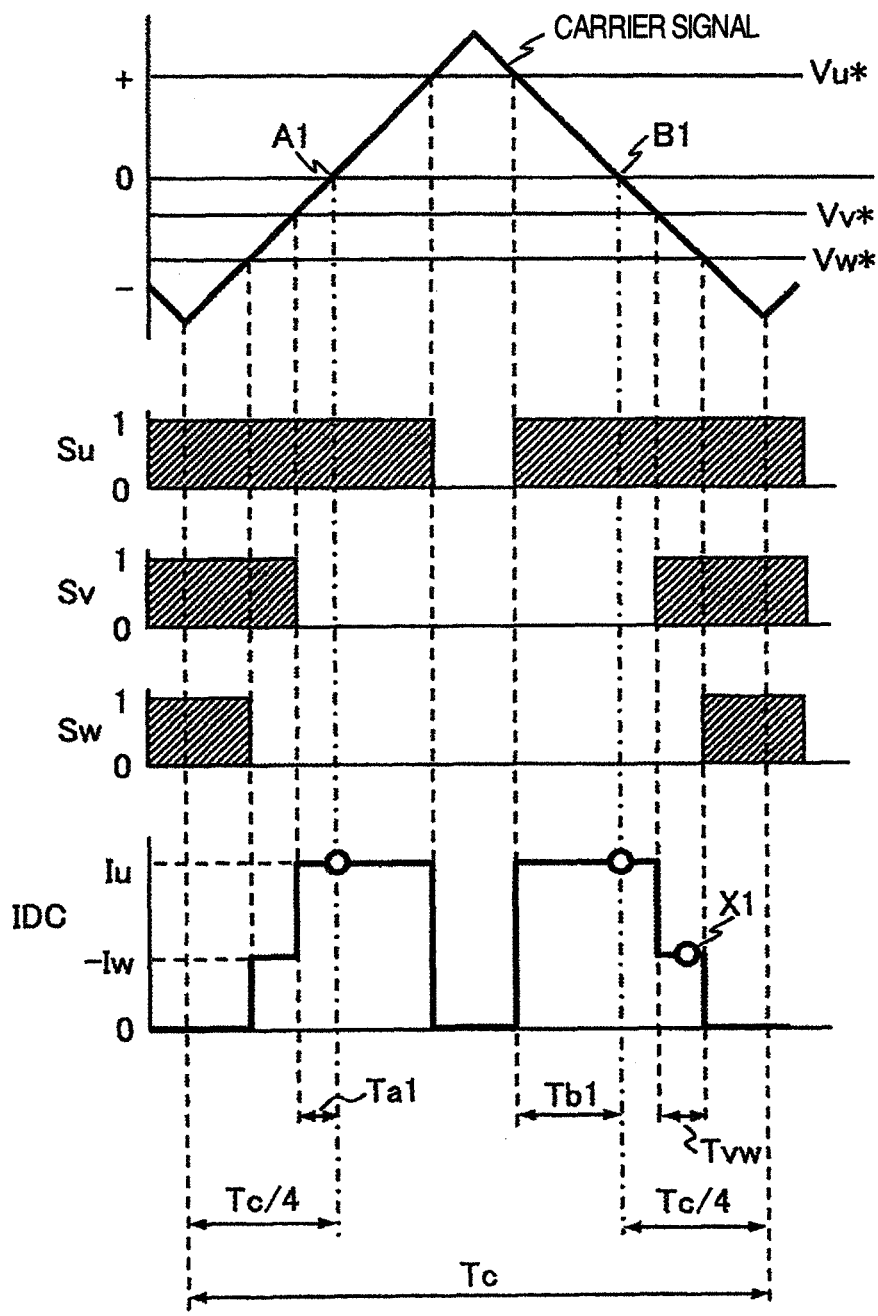
FIG. 5 is a waveform diagram showing the relation of PWM control and DC bus current detection in three-phase modulation system.

FIG. 5 is a diagram illustrating principle of PWM control and detection of DC bus current IDC. Hatching of Su, Sv and Sw represents period that switching devices Sup, Svp and Swp are on. Tc represents 1 period of carrier signal.

When all of switching devices Sup, Svp and Swp are not on or off, DC bus current IDC flows. For example, when only switching device Sup is on, U-phase current Iu flows as DC bus current IDC. This can be detected at timing A1 or B1 that carrier signal has zero level. Hereinafter, this is named zero level detection. When three-phase modulation system is used as PWM control system, that is, when three-phase AC voltage commands Vu*, Vv* and Vw* are the same as three-phase AC voltages Vu, Vv and Vw shown in FIG. 2, current of one phase having different voltage polarity from two other phases is detected by the zero level detection. During period of $-\pi/6 < \theta v < \pi/6$ of FIG. 2, only Vu is positive and Vv and Vw are negative. Accordingly, during this period, U-phase current Iu is detected by zero level detection as shown by A1 and B1 in FIG. 5.

The zero level detection is simple detection algorithm since detection interval according to carrier period is fixed. As described later, when another system is adopted as PWM control system, detection interval can be fixed similarly even if detection timing is different depending on system.

During the period excluding the period of $-\pi/6 < \theta v < \pi/6$, any of V-phase current Iv and W-phase current Iw or values having opposite sign thereto is detected by zero level detection instead of U-phase current Iu. For example, during periods of $-\pi < \theta v < -5\pi/6$ and $5\pi/6 < \theta v < \pi$ of FIG. 2, only Vu is negative and $-$Iu is detected. Even if any current is detected, current can be estimated by the same method as the method of expression (8).

As described above, DC bus current IDC is detected at predetermined intervals and the detected value thereof and detection timing can be used, so that reactive current Ir and active current Ia can be estimated with high accuracy even if detection interval is coarse.

Embodiment 2

Figure 6:
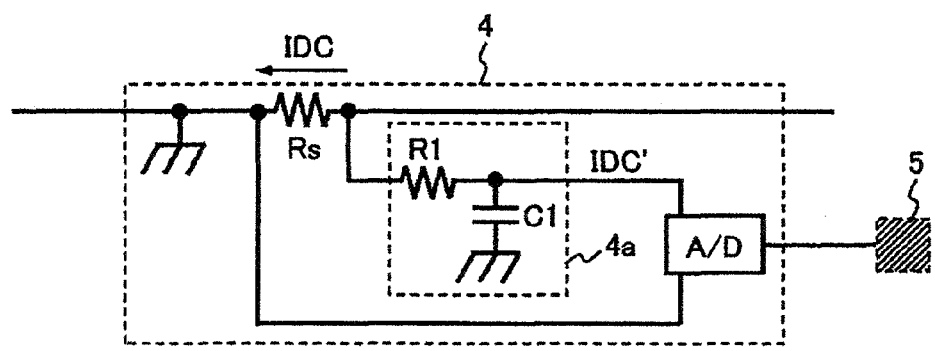
FIG. 6 is a schematic diagram illustrating DC bus current detector in a second embodiment of the present invention.

FIG. 6 is a schematic diagram illustrating DC bus current detector 4 in a second embodiment of the present invention.

In detection of DC bus current IDC, there is a possibility that detected value contains error due to ringing. Accordingly, a low-pass filter 4a is used to remove detection error. Other configuration is the same as the first embodiment.

In FIG. 6, Rs and R1 represent resistors, C1 a capacitor, IDC' an output value of the filter of DC bus current IDC. DC bus current IDC is changed to voltage by means of resistor Rs to be supplied to the low-pass filter 4a composed of resistor R1 and capacitor C1 and is detected by A-D converter after passing of the filter. The low-pass filter 4a has a time constant Tf expressed by expression (9).

$$T_f = R_1 C_1 \quad (9)$$

Figure 7:
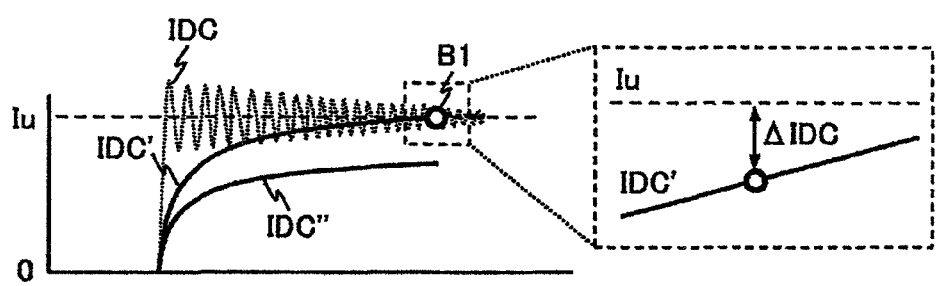
FIG. 7 is a waveform diagram showing detection of DC bus current using a low-pass filter.

FIG. 7 shows waveforms of DC bus current IDC and its filter outputs IDC' and IDC". The time constant Tf of the low-pass filter can be set to thereby remove ringing. However, when the time constant Tf is increased excessively, response is delayed as IDC" and error ratio ΔIDC of detection is increased. Optimum value of the time constant Tf of filter is now described for PWM control system, that is, for (1) three-phase modulation system, (2) three-phase modulation system using third harmonic and (3) two-phase modulation system.

(1) Three-Phase Modulation System

Three-phase AC voltage commands Vu*, Vv* and Vw* are the same as Vu, Vv and Vw shown in FIG. 2. As described above, since Iu is detected during period of $-\pi/6 < \theta v < \pi/6$, the sum of first and second periods is supposed to be $\pi/3$ or less.

The periods from rising edges of DC bus current IDC to zero cross timing of A1 and B1 shown in FIG. 5 are Ta1 and Tb1, respectively. Since Tb1 is larger than Ta1 (Ta1<Tb1), only B1 can be detected instead of detection of A1, so that larger filter time constant Tf can be decided. That is, as shown in FIG. 5, when only inverter output voltage of any one phase is positive, it is desirable that detection is made at timing that triangular carrier signal crosses zero level in direction traveling from position to negative level. On the other hand, when only inverter output voltage of any one phase is negative, it is desirable that detection is made at timing that triangular carrier signal crosses zero level in direction traveling from negative to positive level. In FIG. 5, since only output voltage of U phase is positive, detection at A1 is omitted and time constant Tf with which filter output value IDC' converges within period Tb1 is decided. That is, there is provided comparison means for comparing triangular carrier signal with three-phase voltage command for PWM control, and current sampling means is configured to sample output of current detector at timing that triangular carrier signal crosses zero level in direction traveling from position to negative level.

The period Tb1 is decided by expression (10).

$$T_{b1} = \frac{V_u}{\frac{V_{DC}}{2}} \cdot \frac{T_c}{4} = \frac{K_H T_c}{4} \cos\theta_v \quad (10)$$

where $K_H$ represents a percentage modulation (i.e. modulation factor).

The period Tb1 depends on voltage phase $\theta v$ and is within the range defined by expression (11) during period of $-\pi/6 < \theta v < \pi/6$.

$$\frac{\sqrt{3}}{8} K_H T_c \leq T_{b1} \leq \frac{1}{4} K_H T_c \quad (11)$$

In order to converge IDC' to U-phase current Iu with error ratio ΔIDC within period Tb1, filter time constant Tf is required to be decided by expression (12).

$$T_f = -\frac{T_{b1}}{\log(\Delta I)} \quad (12)$$

Expression (11) is substituted for expression (12), so that expression (13) is obtained.

$$-\frac{\sqrt{3}}{8} \cdot \frac{K_H T_c}{\log(\Delta I)} \leq T_f \leq \frac{1}{4} \cdot \frac{K_H T_c}{\log(\Delta I)} \quad (13)$$

In the three-phase modulation system, filter time constant Tf of expression (13) can be used to remove ringing while detection accuracy is maintained.

(2) Three-Phase Modulation System Using Third Harmonic

Figure 8:
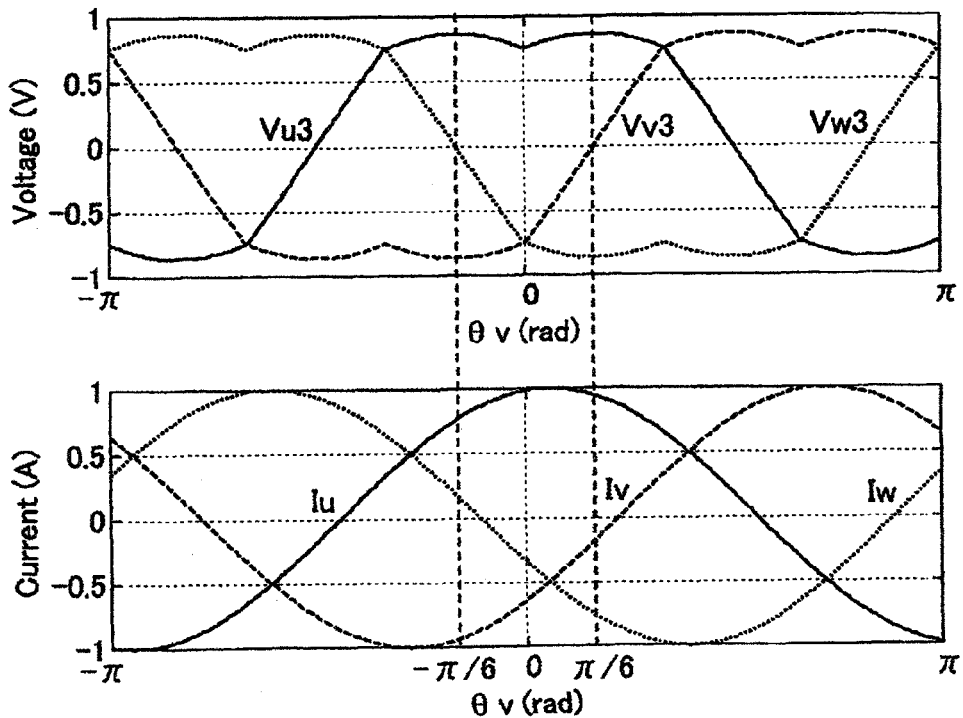
FIG. 8 shows voltage and current waveforms in three-phase modulation system using third harmonic.

FIG. 8 shows three-phase AC voltage commands Vu3, Vv3 and Vw3 when third harmonic is injected in. In this connection, Vu3 during period of $-\pi/6 < \theta v < \pi/6$ is expressed by expression (14).

$$V_{u3} = V_u - \frac{V_u + V_w}{2} = \frac{\sqrt{3}}{2} V_1 \cos\left(\frac{\pi}{6} - \theta_v\right) \quad (14)$$

The waveform of DC bus current IDC is the same as FIG. 5.

The period Tb1 is defined by expression (15).

$$T_b = \frac{V_u}{\frac{V_{DC}}{2}} \cdot \frac{T_c}{4} = \frac{\sqrt{3}}{8} K_H T_c \cos\left(\frac{\pi}{6} - \theta_v\right) \quad (15)$$

In period of $-\pi/6<\theta v<\pi/6$, the range of expression (15) is defined by expression (16).

$$\frac{3}{16} K_H T_c \leq T_b \leq \frac{\sqrt{3}}{8} K_H T_c \quad (16)$$

The filter time constant is expressed by expression (17) in accordance with expression (12).

$$-\frac{3}{16} \cdot \frac{K_H T_c}{\log(\Delta I)} \leq T_f \leq -\frac{\sqrt{3}}{8} \cdot \frac{K_H T_c}{\log(\Delta I)} \quad (17)$$

In the three-phase modulation system using third harmonic, the filter time constant Tf of expression (17) can be used to remove ringing while detection accuracy is maintained.

(3) Two-Phase Modulation System

Figure 9:
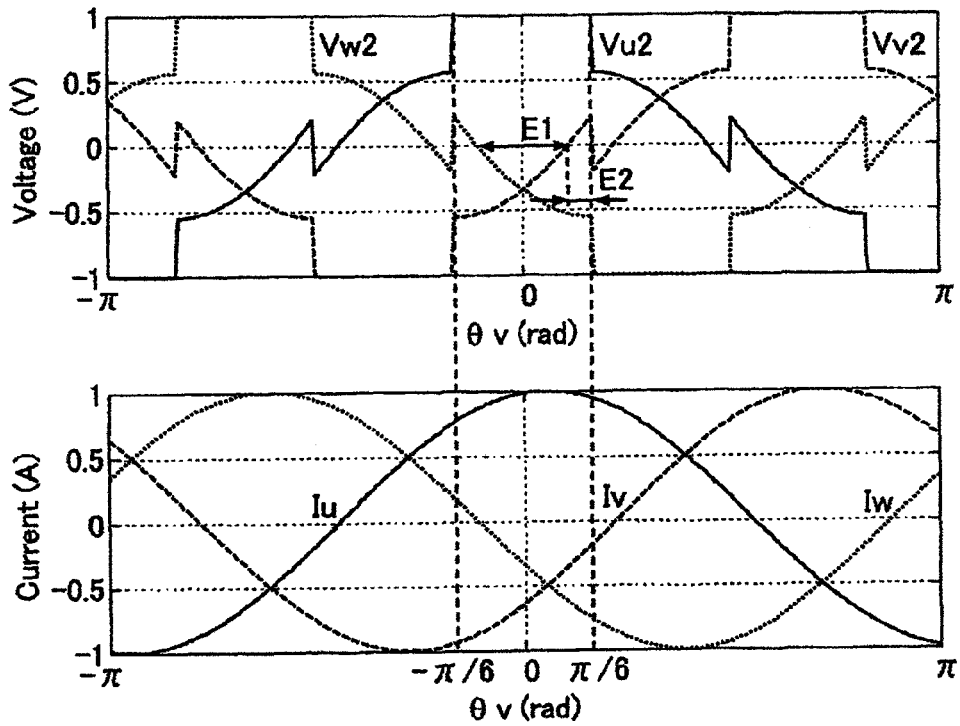
FIG. 9 shows voltage and current waveforms in two-phase modulation system.

FIG. 9 shows three-phase AC voltage commands Vu2, Vv2 and Vw2 of two-phase modulation. In this connection, Vv2 during period of $-\pi/6<\theta v<\pi/6$ is expressed by expression (18).

$$V_{v2} = V_v + (V_{max} - V_u) = V_{max} + V_1 \sqrt{3} \sin\left(\theta_v - \frac{\pi}{3}\right) \quad (18)$$

Figure 10:
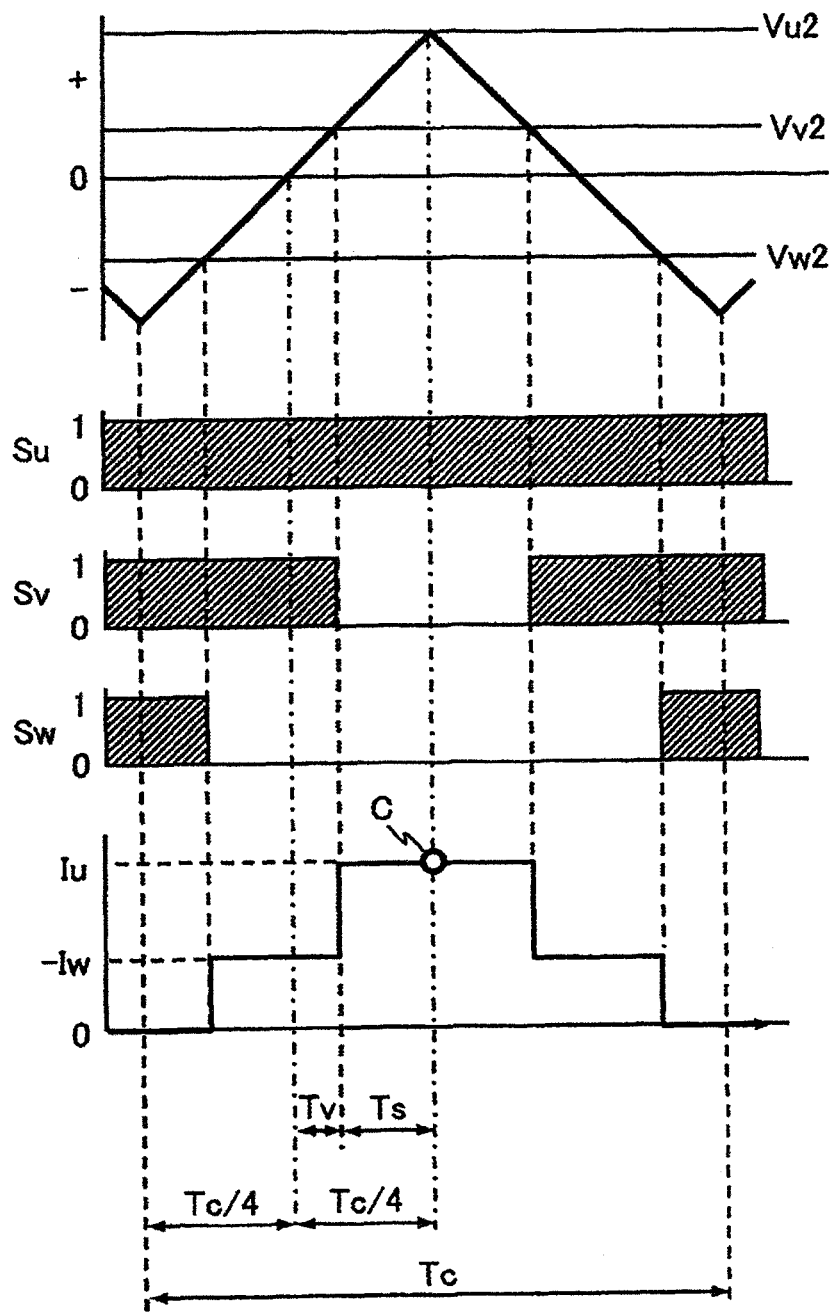
FIG. 10 is a waveform diagram showing the relation of PWM control and DC bus current detection in two-phase modulation system.

FIG. 10 shows waveforms of DC bus current IDC. In two-phase modulation, current of phase having maximum or minimum level of three-phase AC voltage commands Vu2, Vv2 and Vw2 can be detected when carrier signal has maximum or minimum level instead of using zero level detection. In FIG. 10, U-phase current Iu of phase having maximum level can be detected by detection using maximum level.

Period Tv is defined by expression (19) from expression (18).

$$T_v = \frac{V_{v2}}{V_{max}} \cdot \frac{T_c}{4} = \left\{1 + K_H \sqrt{3} \sin\left(\theta_v - \frac{\pi}{3}\right)\right\} \frac{T_c}{4} \quad (19)$$

Period Ts from rising edge of DC bus current IDC to detection is expressed by expression (20).

$$T_s = \frac{T_c}{4} - T_v = \frac{\sqrt{3}}{4} K_H T_c \cos\left(\frac{\pi}{6} + \theta_v\right) \quad (20)$$

In period of $-\pi/6<\theta v<\pi/6$, the range of expression (20) is defined by expression (21).

$$\frac{\sqrt{3}}{8} K_H T_c \leq T_s \leq \frac{3}{8} K_H T_c \quad (21)$$

Filter time constant is expressed by expression (22) in accordance with expression (12).

$$\frac{\sqrt{3}}{8} \cdot \frac{K_H T_c}{\log(\Delta I)} \leq T_f \leq -\frac{3}{8} \cdot \frac{K_H T_c}{\log(\Delta I)} \quad (22)$$

In two-phase modulation system, filter time constant Tf of expression (22) can be used to remove ringing while detection accuracy is maintained.

Figure 11A:
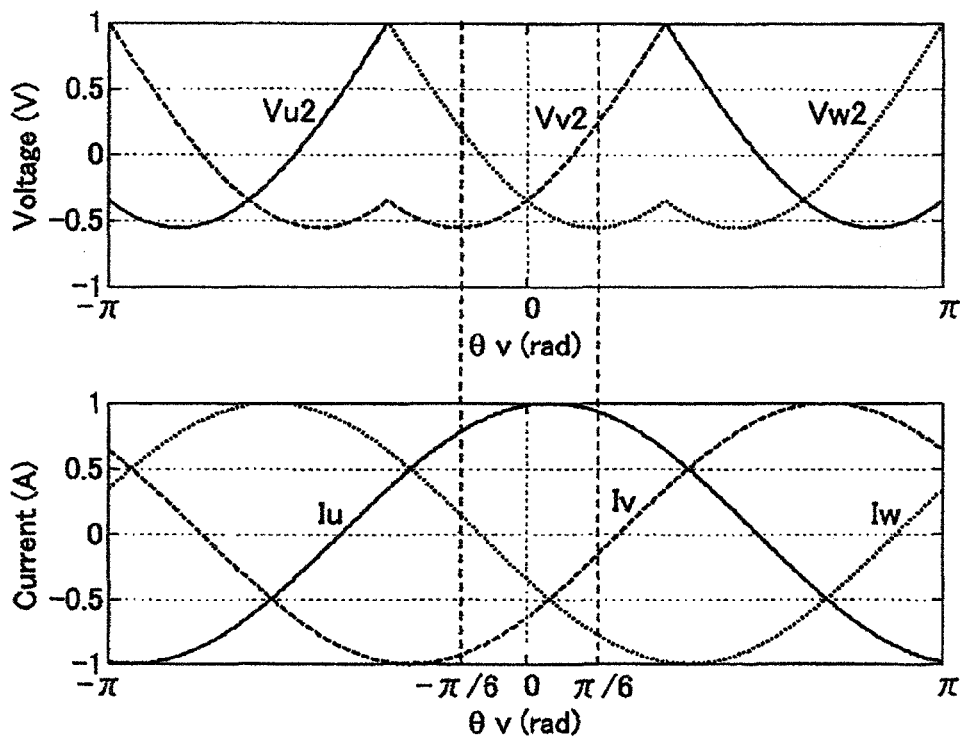
FIGS. 11A and 11B show voltage and current waveforms in case where any of switching devices of upper arm or lower arm is always turned on in two-phase modulation system.
Figure 11B:
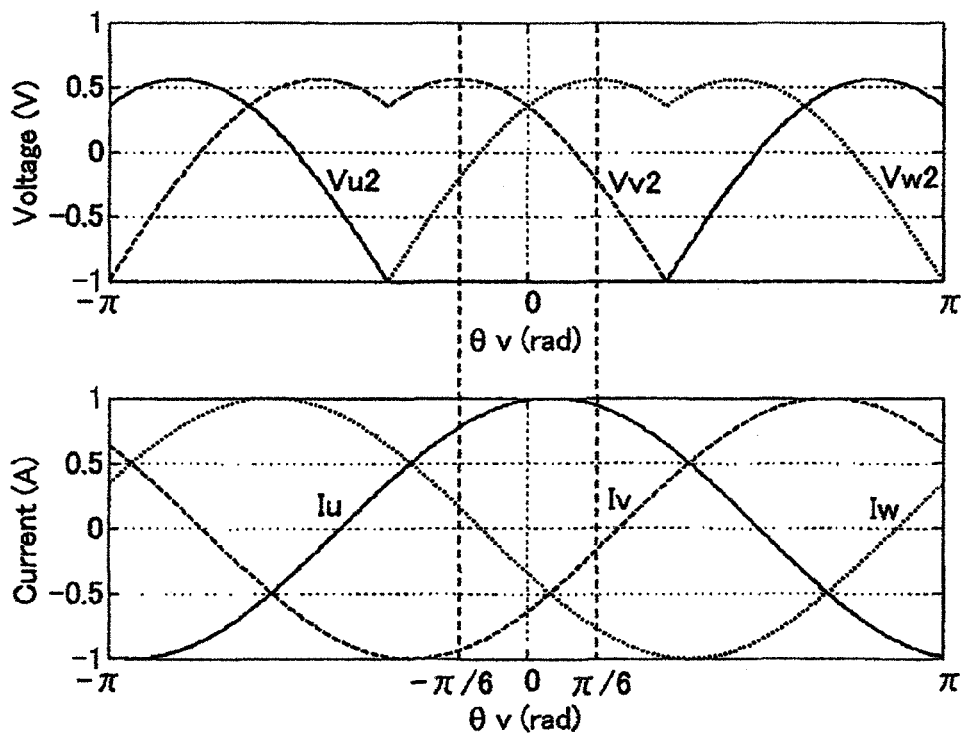

As shown in FIGS. 11A and 11B, even if two-phase modulation system in which only upper-side switching devices Sup, Svp and Swp or lower-side switching devices Sun, Svn and Swn are turned on and off is adopted, expression (22) is derived similarly.

Figure 12:
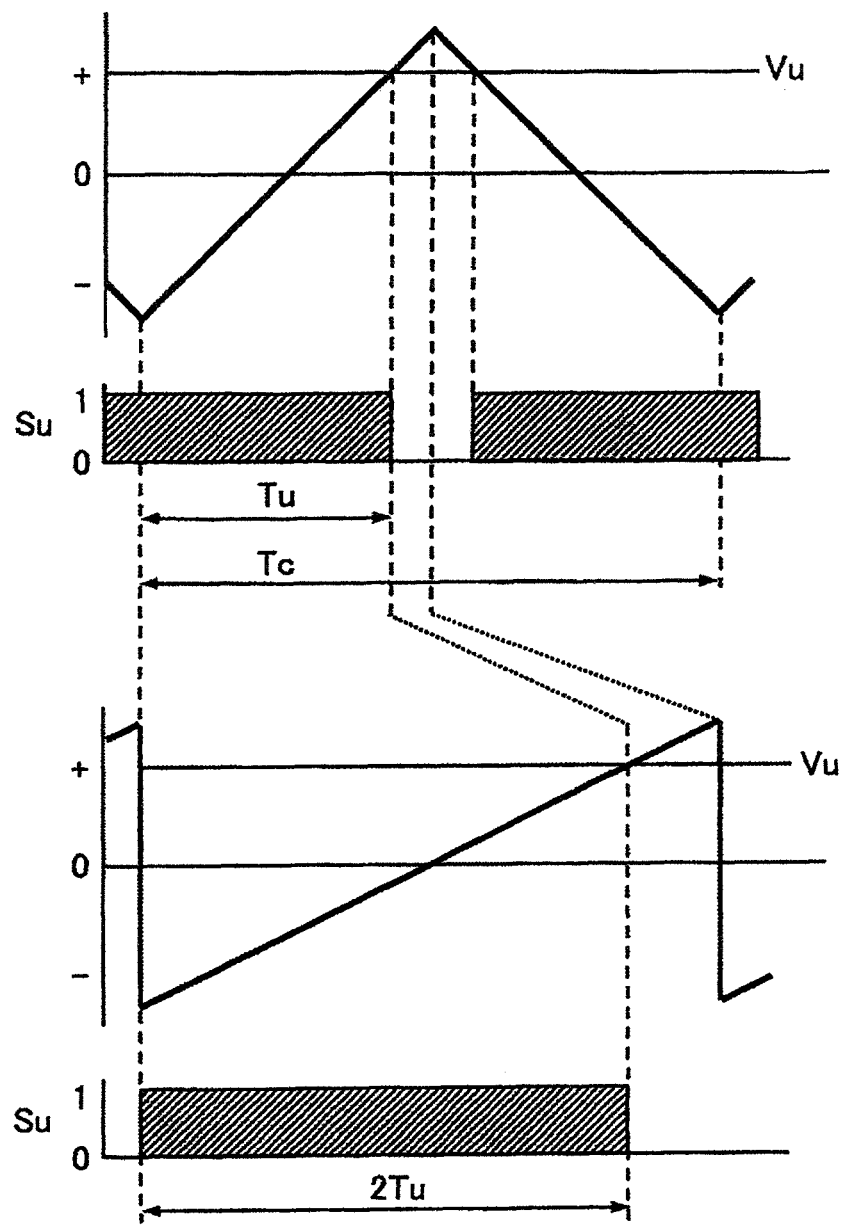
FIG. 12 is a waveform diagram showing the relation of carrier signal and on-time of switching device.

In each modulation system, when sawtooth wave signal is used as carrier signal instead of triangular wave signal, filter time constant Tf is set to two times as large as that calculated by expressions (13), (17) and (22). This reason is that when sawtooth wave signal is used as shown in FIG. 12, the pulse width of on time of switching devices is increased twice and pulse width of DC bus current IDC is also increased twice.

As described above, filter time constant Tf which is optimum to each modulation system can be designed, so that detection error due to ringing can be suppressed and reactive current Ir and active current Ia can be estimated with high accuracy.

Embodiment 3

Figure 13:
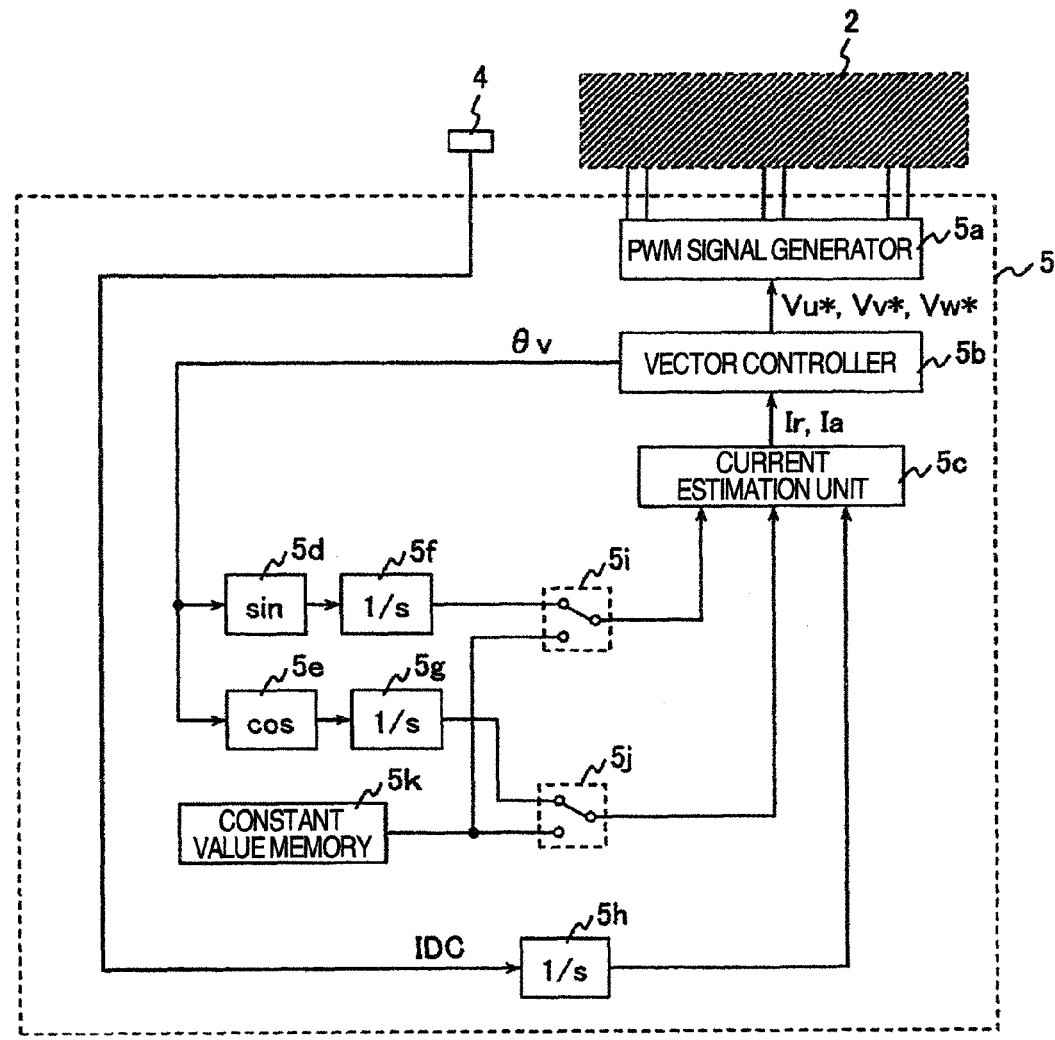
FIG. 13 is a schematic diagram illustrating a control apparatus for AC electric motor according to a third embodiment of the present invention.

FIG. 13 is a schematic diagram illustrating an essential part of a control apparatus for an AC electric motor according to a third embodiment of the present invention.

The control apparatus includes switches 5i and 5j for reducing operation load of inverter control circuit 5 and a constant value memory 5k. Other configuration is the same as the first embodiment.

When the numbers of times of detection during first and second periods are sufficiently large, output values of integrators 5f and 5g become fixed values. Accordingly, when the number of times of detection is large in order to reduce operation load, switches 5i and 5j are switched to replace output values of integrators 5f and 5g by previously calculated theoretical values. The theoretical values are calculated as follows and stored in the constant value memory 5k.

The case where first period is $-\pi/6<\theta v<0$ and second period is $0<\theta v<\pi/6$ in FIG. 2, for example, is described. When expression (5) is integrated for each period, expressions (23) and (24) are obtained.

$$\int_{-\frac{\pi}{6}}^{0} I_u d\theta_v = I_r \int_{-\frac{\pi}{6}}^{0} \sin\theta_v d\theta_v + I_a \int_{-\frac{\pi}{6}}^{0} \cos\theta_v d\theta_v = \left(-1 + \frac{\sqrt{3}}{2}\right) I_r + \frac{1}{2} I_a \quad (23)$$

$$\int_{0}^{\frac{\pi}{6}} I_u d\theta_v = I_r \int_{0}^{\frac{\pi}{6}} \sin\theta_v d\theta_v + I_a \int_{0}^{\frac{\pi}{6}} \cos\theta_v d\theta = \left(1 - \frac{\sqrt{3}}{2}\right) I_r + \frac{1}{2} I_a \quad (24)$$

When expressions (23) and (24) are arranged, expression (25) is derived.

$$\begin{bmatrix} I_r \\ I_a \end{bmatrix} = \begin{bmatrix} -1 + \frac{\sqrt{3}}{2} & \frac{1}{2} \\ 1 - \frac{\sqrt{3}}{2} & \frac{1}{2} \end{bmatrix}^{-1} \begin{bmatrix} \int_{-\frac{\pi}{6}}^{0} I_u \, d\theta_v \\ \int_{0}^{\frac{\pi}{6}} I_u \, d\theta_v \end{bmatrix} \quad (25)$$

Elements of inverse matrix of expression (25) can be stored to reduce operation load as compared with expression (8). That is, the above-mentioned second integration operation means can use previously set value as integrated value.

As described above, inexpensive inverter control circuit 5 which can suppress operation performance can be used to thereby reduce cost.

Embodiment 4

In the embodiment, the first or second period is not necessarily required to be fixed and can be shortened, so that update period of reactive current Ir and active current Ia can be shortened. Consequently, operation period of three-phase AC voltage commands Vu*, Vv* and Vw* can be also shortened and responsibility can be enhanced.

When carrier frequency is high and the number of times of detection of DC bus current IDC per unit time is large, or when rotational speed is low and increased component of voltage phase θv per unit time is small, the number of times of current sampling in each period is increased. In such case, each period can be shortened if necessary, so that update period can be shortened while current estimation accuracy is maintained. That is, there can be provided period shortening means for shortening first and/or second period so that estimation frequency of reactive current and active current by current estimation means is increased.

Conversely, when carrier frequency is low or when rotational speed of electric motor is high, first or second period can be elongated, so that detection accuracy of current can be enhanced. That is, there is provided period elongation means for elongating first and/or second period so as to increase the number of times of current sampling in first and/or second period.

Embodiment 5

The present invention can be applied to the case where current waveform is distorted. For example, in overmodulation area, three-phase AC voltages Vu, Vv and Vw are distorted due to shortage of DC voltage VDC and current waveform is also distorted. In this case, U-phase current waveform contains high order component as expressed by expression (26).

$$I_u = I_r \sum_{k=1}^{n} G_r(k)\sin(k\theta_v) + I_a \sum_{k=1}^{n} G_a(k)\cos(k\theta_v) \quad (26)$$

where Gr represents distortion coefficient of reactive current, Ga distortion coefficient of active current and Gr(k) and Ga(k) magnitude of distortion of k-order component. Reactive current Ir and active current Ia can be estimated similarly to expression (8) by obtaining Gr(k) or Ga(k) by simulation or test working. That is, current estimation means estimates active current and reactive current on the basis of integrated values of sine function and cosine function having integral multiple of output voltage phase as phase in addition to integrated values of sine function and cosine function of output voltage phase.

Embodiment 6

Figure 14:
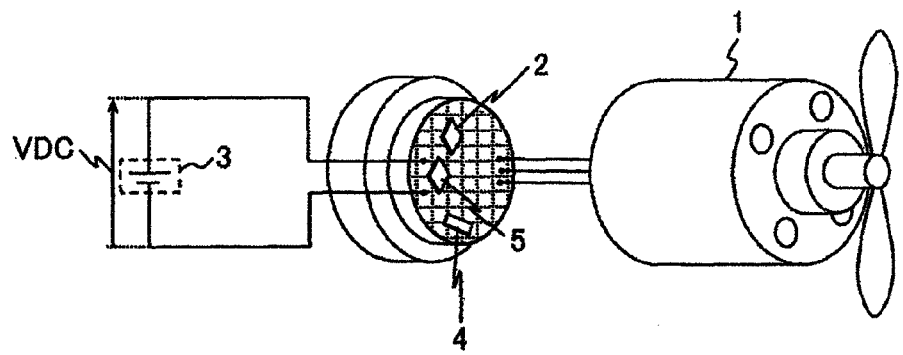
FIG. 14 is a schematic diagram illustrating a control apparatus for AC electric motor according to a sixth embodiment of the present invention.

FIG. 14 is a schematic diagram illustrating a sixth embodiment of the present invention.

For improvement of convenience, inverter 2, DC bus current detector 4 and inverter control circuit 5 are structured into modules. Other configuration is the same as the first embodiment.

The present invention can be easily applied to fan driving apparatus or compressor driving apparatus of air-conditioning and refrigerating machine by module structure. The present invention has a fixed detection period of DC bus current IDC and can maintain estimation accuracy of current even if sampling number is small. Accordingly, high-functioning DC bus current detector is not required. Therefore, the present invention can be applied to the above driving apparatuses, so that cost can be reduced without deteriorating control performance.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus for an AC electric motor including:
   a DC power supply;
   an inverter having a plurality of switching devices to convert DC electric power from the DC power supply into AC electric power;
   an inverter control circuit to PWM control the plurality of switching devices;
   an AC electric motor supplied with electric power from the inverter; and
   a current detector to detect DC bus current flowing through the inverter,
   the control apparatus comprising:
   current sampling means to sample the DC bus current produced by the current detector plural times at predetermined intervals during first and second predetermined periods;
   first integration operation means to integrate sampled current values during the first and second periods;
   second integration operation means to integrate sine and cosine functions of output voltage phase of the inverter at the sampling moment during the first and second periods; and
   current estimation means to estimate reactive and active currents flowing through the AC electric motor on the basis of integrated values of the first and second integration operation means,
   wherein
   the current estimation means multiplies vectors having integrated values of sampled current values during the first and second periods by an inverse matrix having integrated values during the first and second periods, of sine and cosine functions of output voltage phase of the inverter at sampling moment to thereby estimate reactive and active currents flowing through the AC electric motor.

2. The control apparatus for an AC electric motor according to claim 1, wherein the first and/or second integration operation means calculates sum total in plural sampling operations during the first and second periods, respectively.

3. The control apparatus for an AC electric motor according to claim 1, further comprising:

comparison means to compare carrier signal with three-phase voltage commands for PWM control, and wherein the current sampling means samples output of the current detector at timing that the carrier signal has zero level.

4. The control apparatus for an AC electric motor according to claim 1, wherein the second integration operation means uses a previously set value as integration value.

5. The control apparatus for an AC electric motor according to claim 1, further comprising period adjustment means to elongate and/or shorten the first or second period.

6. The control apparatus for an AC electric motor according to claim 5, further comprising period shortening means to shorten the first and/or second period so as to increase estimation frequency of reactive and active currents by the current estimation means.

7. The control apparatus for an AC electric motor according to claim 5, further comprising period elongation means to elongate the first and/or second period so as to increase the number of times of current sampling during the first and/or second period.

8. The control apparatus for an AC electric motor according to claim 1, wherein the current estimation means estimates the active and reactive currents on the basis of integrated values of sine and cosine functions having integral multiple of output voltage phase as phase in addition to integrated values of sine and cosine functions of output voltage phase.

9. The control apparatus for an AC electric motor according to claim 1, wherein the AC electric motor is applied to a driving apparatus of a fan or a compressor included in air-conditioning and refrigerating machine.

10. A control method in a control apparatus for an AC electric motor including a DC power supply;

an inverter having a plurality of switching devices to convert DC electric power from the DC power supply into AC electric power;

an inverter control circuit to PWM control the plurality of switching devices;

an AC electric motor supplied with electric power from the inverter; and a current detector to detect DC bus current flowing through the inverter;

the control method comprising:

a current sampling step to sample the DC bus current produced by the current detector plural times at predetermined intervals during first and second predetermined periods;

a first integration operation step to integrate sampled current values during the first and second periods;

a second integration operation step to integrate sine and cosine functions of output voltage phase of the inverter at the sampling moment during the first and second periods; and a current estimation step to estimate reactive and active currents flowing through the AC electric motor on the basis of integrated values of the first and second integration operation steps, wherein the current estimation step multiplies vectors having integrated values of sampled current values during the first and second periods by an inverse matrix having integrated current values during the first and second periods, of sine and cosine functions of output voltage phase of the inverter at sampling moment to thereby estimate reactive and active currents flowing through the AC electric motor.

11. The control apparatus for an AC electric motor according to claim 1, wherein the first and second periods are successive.

\* \* \* \* \*